Feb. 22, 1955    F. ANDREWS    2,702,715
THREADED EXTENSIBLE PIPE COUPLING FOR INSERTION BETWEEN
AND CONNECTION TO FIXED MEMBERS OF A PIPE LINE
Filed June 24, 1949
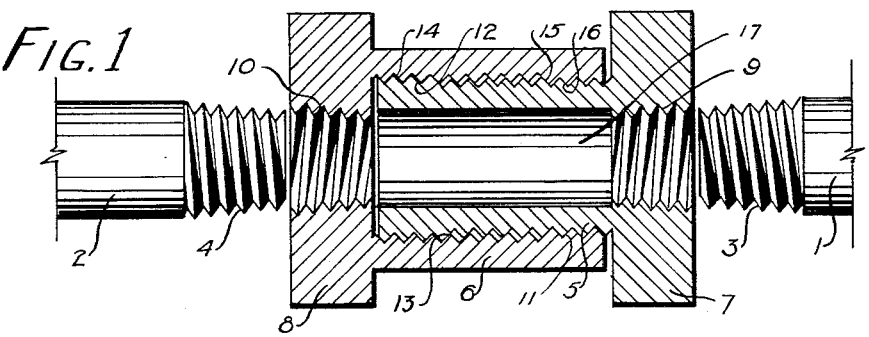
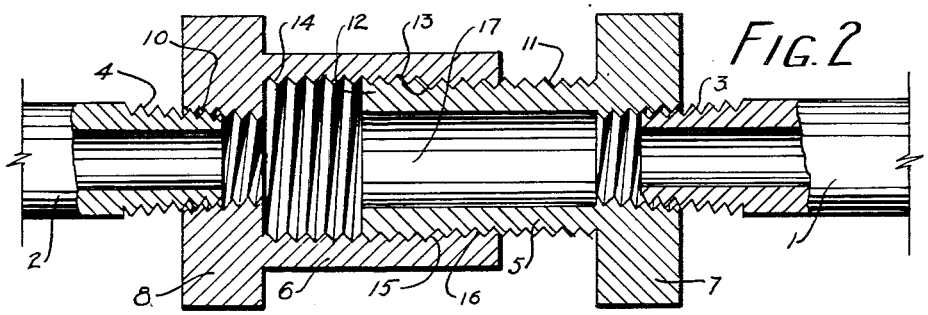
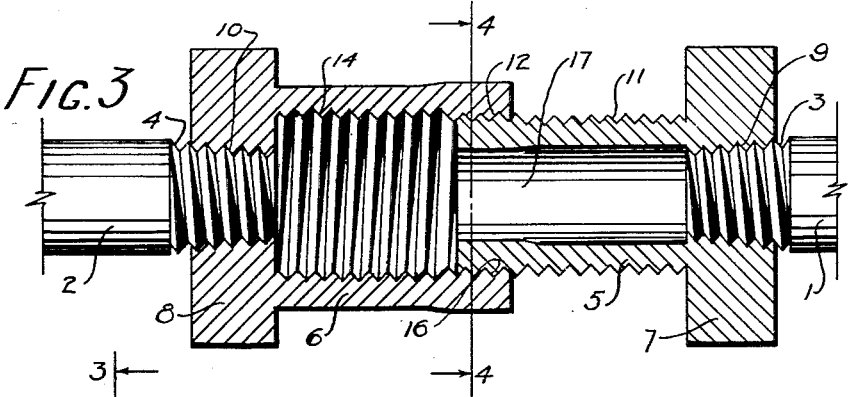
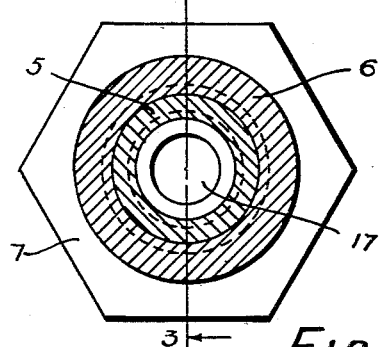
INVENTOR
Forrest Andrews
BY *[signature]*
his ATTORNEYS United States Patent Office 2,702,715
Patented Feb. 22, 1955

2,702,715

THREADED EXTENSIBLE PIPE COUPLING FOR INSERTION BETWEEN AND CONNECTION TO FIXED MEMBERS OF A PIPE LINE

Forrest Andrews, Knoxville, Tenn.

Application June 24, 1949, Serial No. 101,196

2 Claims. (Cl. 285—13)

This invention relates to improvements in pipe connectors, of the character used for joining together adjacent ends of pipes.

Pipe connectors, as known heretofore, have not been entirely satisfactory, especially when the pipes to be connected are rigidly secured at their ends opposite to the ends to be connected together. In installing such connectors, it has been necessary heretofore to spring the ends of the pipes in order to insert the pipe connector therebetween and, when the pipes are large or thick walled, this springing action is very difficult and sometimes impractical. Such pipe connectors, as have been used heretofore, are chiefly of the ground type, comprising three members, two of which are threaded onto the pipes to be connected with matching ground surfaces and having a slip-over tightening ring threaded to one of the members to hold the ground surfaces together. Such members are in fixed relation to each other and require a springing of the pipes or an endwise movement of the pipes toward each other in joining them together.

An object of this invention is to improve the construction of pipe connectors for this purpose by providing interconnected members adapted for connection with the respective pipes which will provide a secure and tight connection therebetween with a minimum of axial movement of the pipes relative to each other in joining them together.

Another object of the invention is to eliminate entirely the necessity for lateral springing the pipes to be connected and yet provide a secure tight connection between the pipes, and to allow these to be connected together in place without relative springing and with a minimum of endwise movement.

Still another object of the invention is to simplify and improve the construction of pipe connectors by providing a construction consisting of two pieces only, interconnected for relative adjustment to a tight sealed relation while allowing these members to be connected with the pipes and to seal the connection therebetween, which construction is more economical to construct and simpler to install than the device provided heretofore.

These objects may be accomplished, according to one embodiment of the invention, by providing two members interconnected for relative endwise adjustment through either threaded connection with each other or other means that will provide for such adjustment. These members are adapted to be normally in contracted relation so as to be inserted between the ends of pipes to be joined even though the latter may be secured rigidly at their opposite outer ends without the necessity for springing the pipes or otherwise materially moving them relatively during the securing of the pipe connector thereto. While held in axial alignment with the pipes to be connected, the members of the connector are adjusted axially relative to each other and simultaneously or alternately secured to the adjacent ends of the pipes whereby to hold the pipes securely together and connect them in open communication while providing a tight seal in the connector and between the elements of the connector and the pipe ends.

This embodiment is illustrated in the accompanying drawings in which—

Fig. 1 is a longitudinal sectional view through the connector with the members contracted and inserted between ends of pipes;

Fig. 2 is a similar view, but showing the members loosely connected with the ends of the pipes and the inter-member seal beginning to tighten;

Fig. 3 is a similar longitudinal sectional view through the connector in normal position after pipes are fully connected on the line 3—3 in Fig. 4; and Fig. 4 is a cross section therethrough on the line 4—4 in Fig. 3.

The invention is shown as adapted for connecting together the adjacent ends of pipes generally designated at 1 and 2. The pipes 1 and 2 are shown as threaded at 3 and 4, respectively, at the adjacent ends thereof, where they are adapted for adjustable connections with the connector, although other forms of adjustable means may be used instead of the screw threads, as desired. These threaded ends 3 and 4 are shown as of the usual tapered thread to facilitate insertion and coupling, although other forms of threads may be used if desired.

The connector comprises male and female members, generally designated at 5 and 6, respectively, constructed for telescoping relation with each other. The members 5 and 6 are shown as having collars 7, 8, on the outer ends thereof, respectively, each of which may be cast in one integral piece with the member or formed separately and welded, soldered, or otherwise secured thereto. The periphery of each of these collars 7 and 8 preferably is of polygonal, hexagonal or octagonal shape, knurled or otherwise formed, so as to facilitate grasping with a wrench or with the hands for rotating the collar and the member with respect to the other member and the pipe.

The collars 7 and 8 are shown as provided with standard threaded pipe joints or sockets 9 and 10, respectively, or with threads or joints to take the pipes to be connected. In the form illustrated, these sockets 9 and 10 are internally threaded with standard tapered threads to match the threads 3 and 4 on the ends of the pipes 1 and 2 so as to form, when screwed together, as usually practiced, a tight secure joint therewith. Packing, lubricants, or other means may be used as desired to afford a tight joint and to facilitate application of the connector.

The male member 5 is shown as externally screw threaded at 11 of uniform diameter throughout the major portion of the length thereof from the collar 7 outwardly and with an enlarged or flared head portion 12 on the outer end of the male member, which is likewise externally screw-threaded with threads of uniform diameter, but of appreciably greater diameter than the greater portion of the length of the male member. A tapering threaded portion 13 joins the threaded portion 11 to the enlarged portion 12.

All threads in the connector are designed to be of the same pitch as pipe threading, and standard as to size of pipes to be connected. Where the connector is designed to connect pipes of different sizes having threads of different design or pitch, all the connector threadings except one of the pipe connecting threads are designed to be of the same pitch, desirably the same pitch as the threads of the larger pipe to be connected.

The female member 6 is made with an enlarged internally threaded bore 14 extending laterally from the collar 8 with an inwardly tapering section 15 terminating in a constricted threaded portion 16 at the end of the female member. While these parts are illustrated and described as screw threaded for relative adjustment, other forms of adjustable connections may be provided as desired.

The diameter of the external threaded part 12 of the male member preferably is constructed oversize as respects the diameter of the restricted internal threaded part 16 of the female member, but of such oversize only as will permit the threads 12 and 16 to be externally expanded their entire, or substantially their entire, length by the use of tools in normal manner for making pipe connections, yet of sufficient difference in diameter as to provide a wrench tight fit when the portions 12 and 16 are substantially engaged. The amount of oversize of the portion 12 as to the portion 16 to provide a wrench tight fit, will depend in each case upon the elasticity of the materials used for the members, their size and design as to thickness of walls.

It is preferred that the length of each of the members 5 and 6 be about four times as long as the threaded lap to be used on the pipes that are to be connected thereby; said length desirably being made up as follows:

For the male member: one-fourth for the collar 7 and the pipe connection threads; seven-sixteenths for the uniform threads 11; one-sixteenth for the tapering threads 13; and one-fourth for the uniform threads 12.

For the female member: one-fourth for the collar and the pipe connection threads; seven-sixteenths for the uniform threads 14; one-sixteenth for the tapering section 15; and one-fourth for the restricted internal threads 16.

The male member 5 has an opening therethrough, generally indicated at 17, approximately of the size of the internal diameter of the pipes to be connected.

It is preferred as above indicated that the enlarged or flared portion 12 of the male member 5 should extend approximately one-fourth of the length of the male member and that the threads, where used, should graduate in diameter in about one-sixteenth of the length of the member from the reduced portion 11 to the flared portion 12. The internally threaded portions of the female member 6 should match in pitch the external threads on the male member and be complementary thereto, as shown, respectively, in Figs. 1 and 2. It is preferred that there be a loose fit in the threaded portions 12 and 14, and 11 and 16, respectively, between these members so they may be turned by hand until the portions 13 and 15 are brought substantially into engagement.

However, when the enlarged or flared portion 12 is moved so that the threads 13 substantially interengage with the threads 15, as shown in Fig. 2, a close, gas-tight or liquid-tight joint is provided therebetween to prevent leakage. While these threaded connections are described as somewhat over-size, the pitch of the threads should equal the pitch of the threaded joints 3 and 4, and 9 and 10, respectively, so that the collars 7 and 8 will be screwed, respectively, onto the pipes simultaneously with the expansion of the members 5 and 6, relative to each other.

In assembling the members 5 and 6, these may be interconnected in any one of several ways. The female member 6 first may be heated and then the male member screwed into place therein, using sufficient force to overcome the frictional connection therebetween, and to facilitate this it is desirable slightly to flare the beginning threads of the female member and slightly to restrict the beginning threads of the male member. The relative dimensions of these is greatly exaggerated in the drawings and need not be so great as is shown. Another method of assembling the parts is by forming the enlarged portion of the male member by expanding that portion 12 after the two members are assembled, by inserting through the opening 10 in the collar 8 an expansible or other punch which will provide the desired expanding action. Still another method of assembly is to construct the collars 7 and 8 separate from the members 5 and 6 and to apply these after the members are screwed together by brazing, welding or otherwise.

The device may be installed on the pipes to be connected as is evident from the relative positions shown in Figs. 1 and 2 and as described. The pipes 1 and 2 should be cut off so that their extreme ends will be spaced substantially in the relative positions no greater than the length of the connector in its assembled relation, shown in Fig. 1. Then upon relatively adjusting the members 5 and 6 lengthwise, these are threaded onto the pipe ends simultaneously or alternately with the axial adjustment of the members. If any difficulty be encountered in starting the second threads, the first threads may be backed off sufficiently until the second thread is started or the sections moved slightly lengthwise. This starting adjustment may be done by hand without requiring a wrench. When both threads have been started, opposing wrenches may be applied on the collars 7 and 8 and the expanding action continued until the connection reaches the tight position illustrated in Fig. 3.

Fig. 2 shows the parts partly expanded with the seal beginning to tighten, and while a seal is provided between the surfaces 13 and 15, these may be expanded still further, as shown in Fig. 3. This additional expanding action is made possible without affecting the sealing relation therebetween, since the relative diameters at 11 and 14 is much closer than is shown, and the female member 6 will expand and the male member contracts sufficiently to permit the relative endwise movement. The additional expanding action after sealing begins, takes care of the necessity for tightening at several points, including the connections with the pipes, while keeping the seal maintained throughout the extended adjustment, as shown in Fig. 3.

While the invention has been illustrated and described in one embodiment, it is recognized that variations and changes may be made therein without departing from the invention, except as specified in the claims.

I claim:

1. A pipe connector comprising two substantially hollow tubular members with one of said members telescoped in the other, said members being initially in contracted relation for interposition between adjacent ends of aligned pipes for expansion lengthwise into engagement with said pipe ends, each of said members having a threaded opening at one end thereof in coaxial alignment with the opening in the other member to receive one of said pipe ends, one member having an enlarged external threaded portion of uniform diameter adjacent its other end, an external threaded reduced portion of uniform diameter adjacent its said one end, an intermediate external threaded portion tapering in diameter from said enlarged threaded end and connected with said reduced threaded portion, said other member having an enlarged internal threaded portion of uniform diameter adjacent its said one end, a reduced internal threaded portion of uniform diameter adjacent its other end, and an intermediate internal threaded portion tapering in diameter from said enlarged internal threaded portion and connected with said reduced threaded portion, said members in their assembled contracted relation having their respective threaded, enlarged, tapering and reduced portions in engagement, and said members when in expanded relation to effect a connection with said pipe ends having the enlarged threaded portion of said one member in engagement with said reduced threaded portion of said other member, said threaded portions of said members having the same pitch and hand.

2. A pipe connector comprising two substantially hollow tubular members with one of said members telescoped in the other, said members being initially in contracted relation for interposition between adjacent ends of aligned pipes for expansion lengthwise into engagement with said pipe ends, each of said members having a threaded opening at one end thereof in coaxial alignment with the opening in the other member to receive one of said pipe ends, one member having an enlarged external threaded portion of uniform diameter adjacent its other end, and an external threaded portion tapering in diameter from said enlarged threaded end toward the other end thereof, and an external threaded portion of uniform diameter extending from said tapering portion to the last-mentioned end thereof, said other member having a reduced internal threaded portion of uniform diameter adjacent its outer end, and an internal threaded portion tapering from said internal reduced threaded portion and connecting therewith, and an internal threaded portion of uniform diameter extending from said internal tapering threaded portion to said one end, said first-mentioned external threaded portion of enlarged uniform diameter being of larger diameter than the first-mentioned reduced threaded portion of the other member for force-fit therebetween, said members when in expanded relation to effect the connection between said pipes having said enlarged threaded portion of said one member in engagement with said internal reduced threaded portion of said other member, said threaded portions of said members having the same pitch and hand.

References Cited in the file of this patent

UNITED STATES PATENTS

| 139,203 | Snow | May 20, 1873 |
| 176,796 | Martin | May 2, 1876 |
| 205,712 | Whitmarsh | July 2, 1878 |
| 969,358 | Goodall | Sept. 6, 1910 |
| 1,957,784 | Johnson | May 8, 1934 |
| 2,467,079 | Corlett | Apr. 12, 1949 |

FOREIGN PATENTS

| 5,492 | Great Britain | Mar. 5, 1895 |
| 567,770 | Great Britain | Mar. 1, 1945 |